United States Patent
Srinivas et al.

(10) Patent No.: US 7,894,393 B2
(45) Date of Patent: Feb. 22, 2011

(54) SYSTEMS AND METHODS FOR DETERMINING SLOTTED MODE OPERATION TIMING IN A HYBRID ACCESS TERMINAL

(75) Inventors: Satyaprasad Srinivas, San Diego, CA (US); Su-Lin Low, San Diego, CA (US); WeiHang Zhou, Zhejiang (CN)

(73) Assignee: Via Telecom, Inc., San Diego, CA (US)

( * ) Notice: Subject to any disclaimer, the term of this patent is extended or adjusted under 35 U.S.C. 154(b) by 620 days.

(21) Appl. No.: 11/862,029

(22) Filed: Sep. 26, 2007

(65) Prior Publication Data

US 2008/0075039 A1 Mar. 27, 2008

Related U.S. Application Data

(60) Provisional application No. 60/827,017, filed on Sep. 26, 2006.

(51) Int. Cl.
*H04W 4/00* (2009.01)
(52) U.S. Cl. ........................................ 370/329; 370/341
(58) Field of Classification Search ........................ None
See application file for complete search history.

(56) References Cited

U.S. PATENT DOCUMENTS

| | | | |
|---|---|---|---|
| 2001/0021195 A1* | 9/2001 | Miller et al. | 370/441 |
| 2003/0144020 A1* | 7/2003 | Challa et al. | 455/522 |
| 2004/0037222 A1* | 2/2004 | Kim et al. | 370/229 |
| 2004/0214575 A1* | 10/2004 | Jovanovic | 455/444 |
| 2006/0030373 A1* | 2/2006 | Park | 455/574 |
| 2006/0176870 A1* | 8/2006 | Joshi et al. | 370/345 |
| 2007/0281709 A1* | 12/2007 | Timms | 455/450 |
| 2008/0109669 A1* | 5/2008 | Kim | 713/323 |
| 2009/0296617 A1* | 12/2009 | Lin et al. | 370/311 |
| 2010/0022242 A1* | 1/2010 | Nizri et al. | 455/435.2 |

FOREIGN PATENT DOCUMENTS

WO 2006096295 A1 9/2006

* cited by examiner

*Primary Examiner*—Chi H Pham
*Assistant Examiner*—Soon-Dong D Hyun
(74) *Attorney, Agent, or Firm*—Baker & McKenzie LLP

(57) ABSTRACT

A method for determining slotted mode operation timing in a hybrid access terminal comprises acquiring a first network, determining a first access interval for the first network, acquiring a second network, determining a second access interval for the second network, determining if the first and second access intervals overlap, and re-determining the second access interval when it is determined that the first and second access intervals overlap.

20 Claims, 5 Drawing Sheets

SYSTEMS AND METHODS FOR DETERMINING SLOTTED MODE OPERATION TIMING IN A HYBRID ACCESS TERMINAL

RELATED APPLICATIONS INFORMATION

The application claims priority under 35 U.S.C. 119(e) to U.S. Provisional Patent Application Ser. No. 60/827,017, entitled "Sleep/Wake Cycle Determination Algorithm in Hybrid ATS," filed Sep. 26, 2006 and which is incorporated herein by reference in its entirety.

BACKGROUND

1. Field of the Invention

The embodiments described below are related to wireless communication and more particularly to the determination of non-overlapping cycles during which an access terminal will wake up and communicate with multiple different systems with which it is configured to communicate.

2. Background of the Invention

There are multiple types of wireless Wide Area Networks (WAN's) currently deployed throughout the world. These WAN's are defined by the technology used to communicate with the access terminals operating with the WAN. Historically the access terminals could only communicate using one technology. Eventually dual-mode and dual-band access terminals were developed that could communicate using multiple technologies and/or at multiple frequencies; however, the terminals could only switch between technologies or frequency bands via a hard transition, i.e., when the terminal went out of range of a preferred network, it would be dropped. If the terminal could not re-establish communication with the preferred network, then the terminal would attempt to communicate with another network using another technology and/or a different frequency band.

For example, in the CDMA2000 family of technologies, there are multiple different technologies that can be deployed with a wireless WAN. Code Division Multiple Access or CDMA is a multiple access scheme for digital radio, to send voice, data, and signaling data (such as a dialed telephone number) between access terminals, e.g., mobile phones, and cell sites. In a CDMA system different communication channels are defined with codes (PN sequences). CDMA permits many simultaneous transmitters on the same frequency channel, unlike Frequency Division Multiple Access (FDMA), used in the Advanced Mobile Phone System (AMPS), and Time Division Multiple Access (TDMA), used in Global System for Mobile communications (GSM) and Digital-AMPS (D-AMPS), which use single channel per access terminal or a smaller group of access terminals.

CDMA2000 has a relatively long technical history, and remains compatible with the older CDMA telephony methods, such as cdmaOne, the original CDMA technology. The CDMA2000 family of technologies include CDMA2000 1×RTT and CDMA2000 EV-DO. Each of these are approved are approved radio interfaces and are deployed throughout the world.

CDMA2000 1×RTT, the core CDMA2000 wireless air interface standard, is also known as 1×, 1×RTT, and IS-2000. The designation "1×RTT", meaning "1 times Radio Transmission Technology", indicates the same RF bandwidth as the IS-95, or cdmaOne standard, i.e., a duplex pair of 1.25 MHz radio channels. This contrasts with 3×RTT, which uses channels 3 times as wide (3.75 MHz) as the IS-95 channel. 1×RTT almost doubles the capacity of IS-95 by adding 64 more traffic channels to the forward link, orthogonal to (in quadrature with) the original set of 64 channels defined in the IS-95 standard. Although capable of higher data rates, most deployments are limited to a peak of 144 kbit/s. 1×RTT also made changes to the data link layer for the greater use of data services, including medium and link access control protocols and Quality of Service (QoS). The IS-95 data link layer only provided "best effort delivery" for both voice and data.

1×RTT officially qualifies as $3^{rd}$ Generation (3G) technology, but it is considered by some to be a 2.5 G, or sometimes 2.75 G technology. This actually allows it to be deployed in 2G spectrum in some countries that limit 3G systems to certain bands.

CDMA2000 3× or EV-DO Rev. B uses a pair of 3.75 MHz radio channels (i.e., 3×1.25 MHz) to achieve higher data rates. The 3× version of CDMA2000 is sometimes referred to as Multi-Carrier or MC. The 3× version of CDMA2000 has not been deployed and is not under development at present.

CDMA2000 Evolution-Data Optimized or Evolution-Data Only (EV-DO) is a telecommunications standard for the wireless transmission of data through radio signals, typically for broadband Internet access. It employs multiplexing techniques such as CDMA as well as Frequency Division Duplex (FDD) to maximize the amount of data transmitted. It is standardized by the 3rd Generation Partnership Project 2 (3GPP2) as part of the CDMA2000 family of standards and has been adopted by many mobile phone service providers around the world—particularly those previously employing CDMA networks, as opposed to GSM networks.

The EV-DO feature of CDMA2000 networks is significantly faster than the Enhanced Data Rates for GSM Evolution (EDGE) used by GSM networks. It provides access to mobile devices with air interface speeds of up to 2.4 Mbit/s with Rev. 0 and up to 3.1 Mbit/s with Rev. A. High-Speed Downlink Packet Access (HSDPA), a competing technology for Wideband Code Division Multiple Access (W-CDMA), Rev A modems have the ability to maintain both circuit switched voice and packet data calls from the same radio. It provides an IP based network. There have been several revisions of the standard, named alphabetically starting with the first as Rev. A ("revision A"), while the first standard is referred to simply as Rev. 0.

Rev 0, the initial design of EV-DO, was developed in 1999 to meet requirements for a greater-than-2-Mbit/s downlink for stationary communications, as opposed to mobile communication such as a moving cellular phone. Initially, the standard was called High Data Rate (HDR), but was renamed to 1×EV-DO after it was ratified by the International Telecommunication Union (ITU) and it was given the numerical designation TIA-856, or IS-856.

Rev. A offers fast packet establishment on both the forward and reverse links along with air interface enhancements that reduce latency and improve data rates. In addition to the increase in the maximum burst downlink rate from 2.45 Mbit/s to 3.1 Mbit/s, Rev. A has a significant improvement in the maximum uplink data rate, from 153 kbit/s to a maximum uplink burst rate of 1.8 Mbit/s. This improvement assumes early acknowledgement of the first sub-packet, typical data rates therefore average below 1 Mbit/s.

EV-DO Rev B is a multi-carrier evolution of the Rev A specification. It maintains the capabilities of EVDO Rev A, and provides the following enhancements: Higher rates per carrier (up to 4.9 Mbit/s on the downlink per carrier). Typical deployments are expected to include 3 carriers for a peak rate of 14.7 Mbit/s; higher rates by bundling multiple channels together enhances user experience and enables new services such as high definition video streaming; statistical multiplexing across channels to further reduce latency, enhancing the experience for latency-sensitive services such as gaming, video telephony, remote console sessions and web browsing; increased talk-time and standby time; hybrid frequency reuse, which reduces the interference from the adjacent sectors and improves the rates that can be offered, especially to users at the edge of the cell; efficient support for services that have asymmetric download and upload requirements, i.e. different data rates required in each direction, such as file transfers, web browsing, and broadband multimedia content delivery.

For clarity, various aspects of the techniques are described below for a High Rate Packet Data (HRPD) system that implements IS-856. HRPD is also referred to as Evolution-Data Optimized (EV-DO), Data Optimized (DO), High Data Rate (HDR), etc. The terms HRPD and EV-DO are used often interchangeably. As mentioned, currently HRPD Revisions (Revs.) 0, A, and B have been standardized, HRPD Revs. 0 and A are deployed, and HRPD Rev. C is under development. HRPD Revs. 0 and A cover single-carrier HRPD (1×HRPD). HRPD Rev. B covers multi-carrier HRPD and is backward compatible with HRPD Revs. 0 and A.

While the above technologies are deployed, e.g., throughout North America, they are not necessarily uniformly deployed and may be deployed in an overlapping manner. For example, certain areas may have HRDP Rev0 deployed, while others may have Rev. A., and both can be deployed in an overlapping fashion with a 1×RTT deployment.

Accordingly, it would be preferable to be able to execute a soft transition from one network to another. In other words, it is preferable to deploy a hybrid access terminal with multiple radios, or a configurable radio, which can alternatively communicate with various networks. In such a hybrid terminal, however, it will be necessary to ensure that there are not conflicting attempts to use the terminal resources to communicate simultaneously with multiple networks.

For example, conventional access terminals are designed to enhance their battery performance by ensuring that they only monitor the network periodically. In other words, when the terminal is in active, it will typically enter a sleep mode and awake periodically to check in with the network. The exact periodicity and time at which the access terminal and the network communicate with each other is typically defined by the associated standard. This is commonly known as "slotted mode of operations". Accordingly, in a hybrid terminal it will be important to ensure that the terminal does not simultaneously attempt to wake up and access multiple networks.

SUMMARY

A method for determining slotted mode operation timing in a hybrid access terminal comprises acquiring a first network, determining a first access interval for the first network, acquiring a second network, determining a second access interval for the second network, determining if the first and second access intervals overlap, and re-determining the second access interval when it is determined that the first and second access intervals overlap.

In another aspect, A wireless access terminal configured to monitor signals from at least two different access networks configured to use different communication technologies. The wireless access terminal comprises a first modem configured to monitor signals from a first access network, a second modem configured to monitor signals from a second access network, a memory configured to store instructions, and a processor coupled with the memory, the processor configured to access the instructions. The instructions are configured to cause the processor to control the first modem to acquire a first network, determine a first access interval for the first network, control the second modem to acquire a second network, determine a second access interval for the second network, determine if the first and second access intervals overlap, and re-determine the second access interval when it is determined that the first and second access intervals overlap.

These and other features, aspects, and embodiments of the invention are described below in the section entitled "Detailed Description."

BRIEF DESCRIPTION OF THE DRAWINGS

Features, aspects, and embodiments of the inventions are described in conjunction with the attached drawings, in which.

DETAILED DESCRIPTION

The transmission techniques described herein may be used for various wireless communication systems such as CDMA, TDMA, FDMA, OFDMA, and SC-FDMA systems. The terms "systems" and "networks" are often used interchangeably. A CDMA system may implement a radio technology such cdma2000, Universal Terrestrial Radio Access (UTRA), Evolved UTRA (E-UTRA), etc. cdma2000 covers IS-2000, IS-95 and IS-856 standards. UTRA includes Wideband-CDMA (W-CDMA) and Low Chip Rate (LCR). A TDMA system may implement a radio technology such as Global System for Mobile Communications (GSM). An OFDMA system may implement a radio technology such as Long Term Evolution (LTE), IEEE 802.20, Flash-OFDM®, etc. UTRA, E-UTRA, GSM and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

As noted above, in a hybrid terminal, it is necessary to ensure that the terminal does not attempt to wake up and check in with multiple networks or systems at the same time. In other words, while the terminal is asleep, the protocol stacks associated with each network will be running and will independently cause the terminal to wake up and attempt to check in with the associated network. If these attempts were to occur at the same time, then one or both attempts would likely result in failure and the terminal could miss important information and/or incoming communications.

In a 1×HRPD terminal for example, a 32-bit random number, termed the SessionSeed is generated by the Address Management Protocol and is used by the Idle State Protocol to determine when the terminal will wake up and check in with the network. The wake up interval is called DoWakeTime.

In a 1x-RTT terminal, the Slot-Cycle Index (SCI), a number that is obtained after receiving the overhead messages from the network is used to determine the exact time when the 1x-RTT modems monitors the forward paging channel, i.e., checks in with the network. The wake up interval is called the WakeTime. It should be noted that the wake up interval can be frequent, e.g., SCI=0, or less frequent, e.g., SCI=1, SCI=2, etc., as illustrated in more detail below.

Therefore, if a hybrid terminal is configured for both 1xRTT and 1xHRDP operation, then there should be a means for ensuring that the DoWakeTime interval and the WakeTime interval do not overlap. A particular access terminal can actually comprise multiple modems, i.e., be configured for multiple technologies, beyond just two, and beyond just 1xRTT and 1xHRPD. More generally, therefore, the terminal should be configured so that the different modems do not attempt to monitor their respective networks at the same time.

Figure 1:
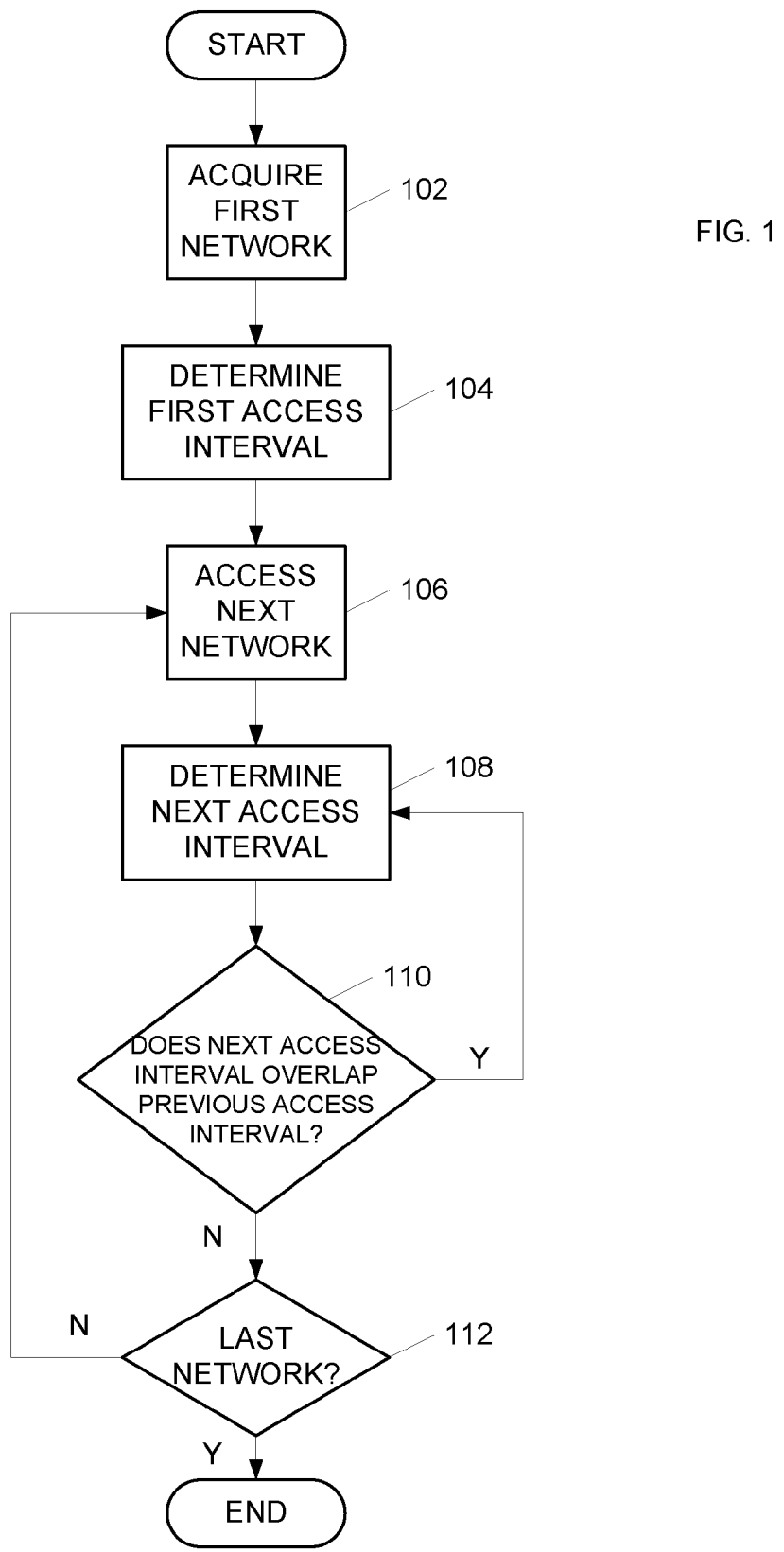
FIG. 1 is flow chart illustrating an example method for calculating the network access timing in a hybrid terminal in order to avoid conflicts between the different modems in accordance with one embodiment.

FIG. 1 is flow chart illustrating an example method for calculating the network access timing in a hybrid terminal in order to avoid conflicts between the different modems in accordance with one embodiment. In step 102, a first network can be acquired using the associated modem. In step 104, the protocol stack associated with the first modem can determine a first access interval, e.g., the frequency with which the associated modem will attempt to access the network.

In step 106, a second network can be accessed using the associated modem. In FIG. 1, the term "next network" is used to convey the fact the terminal can be configured to communicate via more than two networks or technologies. In step 108, the associated protocol stack can determine the access interval for the second network. In step 110, the protocol stack can be configured to determine whether the previous intervals and the second or next interval overlap. If they do, then the next access interval can be re-calculated in step 108 in order to avoid a conflict. If the access intervals do not overlap, then it can be determined whether there are more networks to be concerned with. If there are further networks, then the process can repeat starting in step 106 for the next network.

Figure 2:
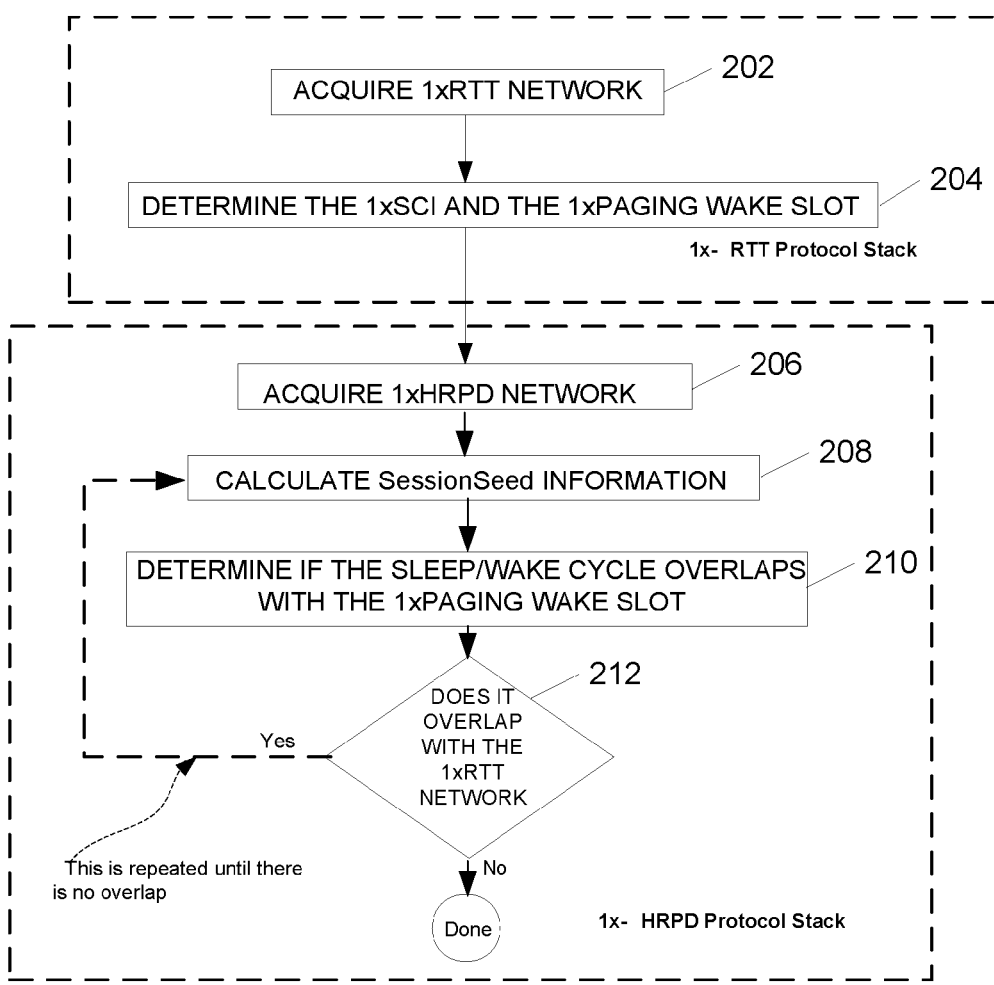
FIG. 2 is a flow chart illustrating a specific example of the method of FIG. 1 where the hybrid terminal is configured for both 1×RTT and 1×HRPD communication.

FIG. 2 is a flow chart illustrating a more specific example where the hybrid terminal is configured for both 1xRTT and 1xHRPD communication. In step 202, the access terminal can control the 1xRTT modem to access the 1xRTT network. As will be understood, the access terminal can obtain certain overhead messages from the 1xRTT network. These overhead messages can include the assigned SCI, which the terminal can use to determine the access interval in step 204. Again it will be understood that in a 1xRTT system the access interval, i.e., WakeTime interval is determined using the SCI and a hash function.

In step 206, the terminal can control the 1xHRPD modem to access the 1xHRPD network. The Address Management Protocol then calculates the SessionSeed information in step 208. The SessionSeed information is used by the Idle State Protocol to determine the access interval, i.e., DoWakeTime interval. The DoWakeTime interval can also be defined as the transition from Sleep State to the Monitor State needed to allow the terminal to send and receive, respectively, a synchronous capsule sent in each Control Channel cycle C satisfying:

$(C+R) \bmod NIDPSleep=0$, where C is the number of Control Channel cycles since the beginning of CDMA System Time and R is obtained as follows:

R is the result of applying a hash function using the following parameters:
 Key=SessionSeed;
 Decorrelate=6×SessionSeed[11:0]; and
 N=NIDPSleep The terminal can be configured to then determine, in step 210, whether the resulting access intervals and timing will overlap.

Figure 3:
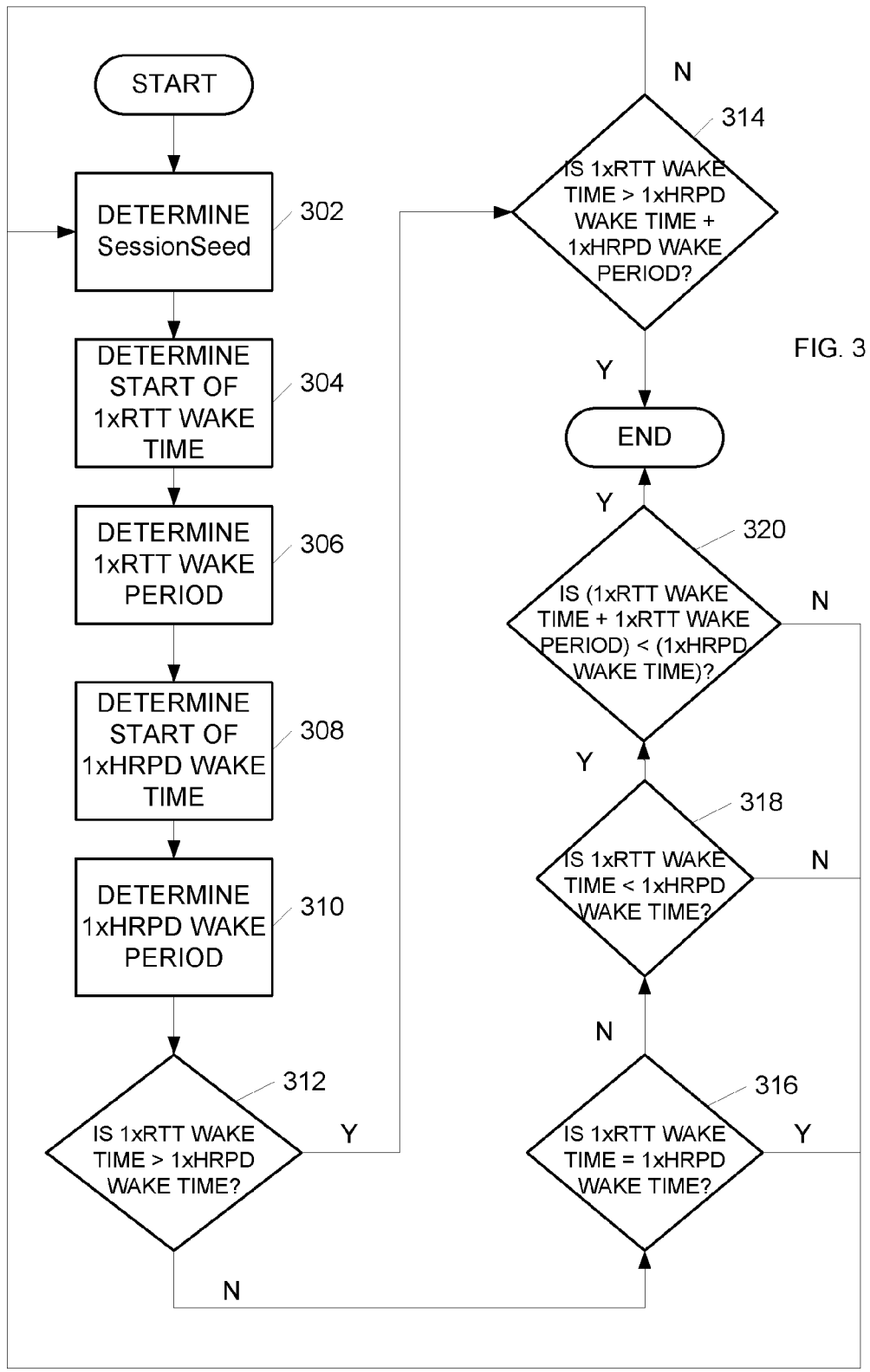
FIG. 3 is a diagram illustrating an example method for determining whether multiple access intervals will overlap in accordance with one embodiment.

FIG. 3 is a diagram illustrating an example method for determining whether the access intervals will overlap. In step 302, the 1xHRPD SessionSeed can be determined. In step 304, the start of the next wake time, or slot for the 1xRTT system can be determined. In step 306, the duration, or wake period for the access can be determined. In steps 308 and 310, respectively, the 1xHRPD wake time and wake period can be determined. In step 312, it can then be determine whether the 1xRTT wake time is greater than the 1xHRDP wake time.

If it is determined in step 312 that the 1xRTT wake time is greater than the 1xHRDP wake time, then is step 314 it can be determined whether the 1xRTT wake time is greater than the 1xHRDP wake time plus the 1xHRDP wake period. If it is, then it can be determined that there will be no overlap, i.e., the SessionSeed determined in step 302 is fine. If the 1xRTT wake time is not greater than the 1xHRDP wake time plus the 1xHRPD wake period, then a new SessionSeed can be determined in step 302 and the process can repeat in order to prevent an overlap.

If it is determined in step 312 that the 1xRTT wake time is not greater than the 1xHRDP wake time, then it can be determined in step 316, whether the 1xRTT wake time is equal to the 1xHRDP wake time. If it is, then a new SessionSeed can be determined in step 302 and the process can repeat in order to prevent an overlap. If the 1xRTT wake time is not equal to the 1xHRDP wake time, then it can be determined, in step 318, whether the 1xRTT wake time is less than the 1xHRDP wake time. If it is not, then a new SessionSeed can be determined in step 302 and the process can repeat in order to prevent an overlap.

If the 1xRTT wake time is less than the 1xHRDP wake time, then it can be determined, in step 320, whether the 1xRTT wake time plus 1xRTT wake period is less than the 1xHRDP wake time. If it is, then it can be determined that there will be no overlap, i.e., the SessionSeed determined in step 302 is fine. If it is not, then a new SessionSeed can be determined in step 302 and the process can repeat in order to prevent an overlap.

It should be noted that steps 312-320 may need to be repeated several times depending on the implementation. For example, in the above example implementation, i.e., 1xRTT and 1xHRPD, the slot cycles for the two systems are multiples of each other. Accordingly, overlap will need to be checked and eliminated for all multiples. The following table can be used to determine the number of iterations needed depending on the 1xRTT SCI.

| 1xRTT SCI | Num-Iterations-Required-To-Determine-Conflict |
|---|---|
| 0 | $(N_{idpsleep})/(2^{1xRTTSci} \times 1.28) = 4$ |
| 1 | $(N_{idpsleep})/(2^{1xRTTSci} \times 1.28) = 2$ |
| 2 | $(N_{idpsleep})/(2^{1xRTTSci} \times 1.28) = 1$ |
| 3 | $(2^{1xRTTSci} \times 1.28)/(N_{idpsleep}) = 2$ |
| 4 | $(2^{1xRTTSci} \times 1.28)/(N_{idpsleep}) = 4$ |
| 5 | $(2^{1xRTTSci} \times 1.28)/(N_{idpsleep}) = 8$ |
| 6 | $(2^{1xRTTSci} \times 1.28)/(N_{idpsleep}) = 16$ |
| 7 | $(2^{1xRTTSci} \times 1.28)/(N_{idpsleep}) = 32$ |

Figure 4:
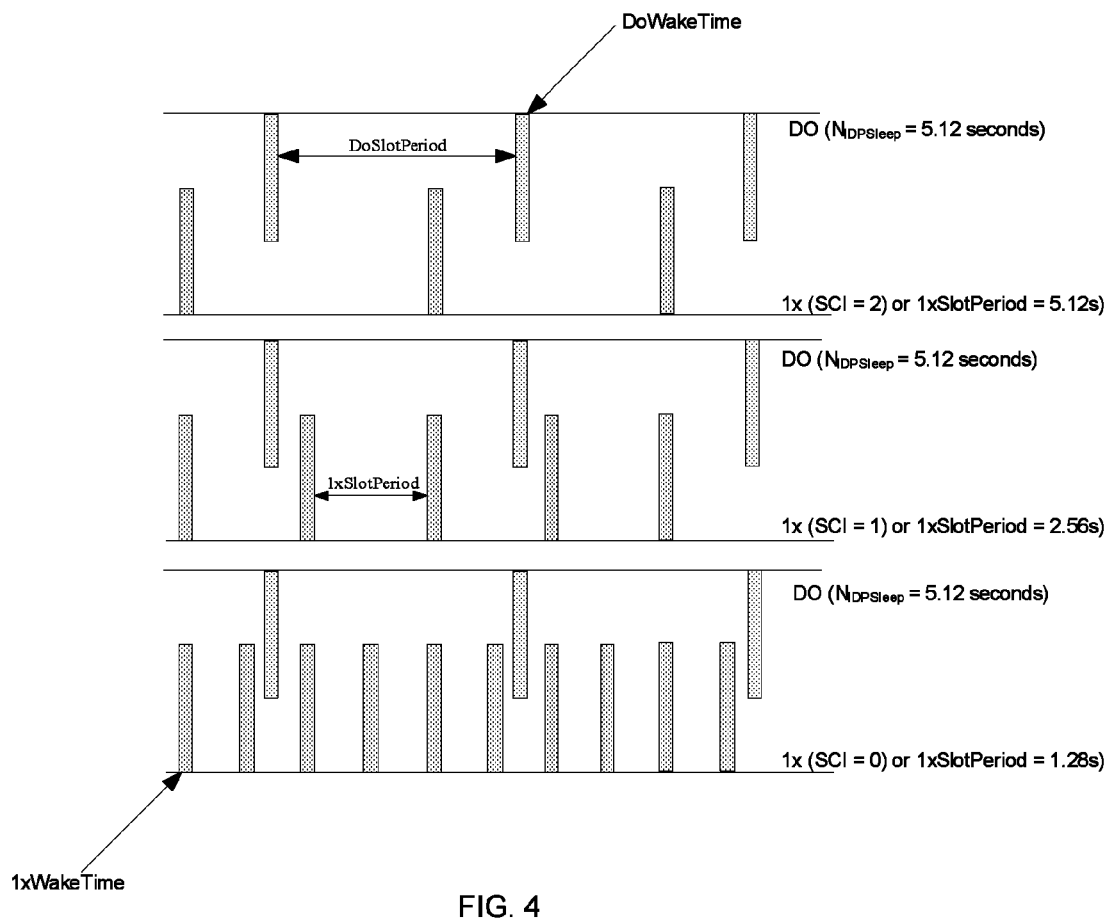
FIG. 4 is a diagram illustrating the 1×RTT slot cycle for varying SCI.

FIG. 4 is a diagram illustrating the 1xRTT slot cycle for varying SCI. As can be seen, the 1xHRPD slot cycle should be calculated so as to avoid overlap with the 1×RTT slot cycle regardless of the SCI being used.

Figure 5:
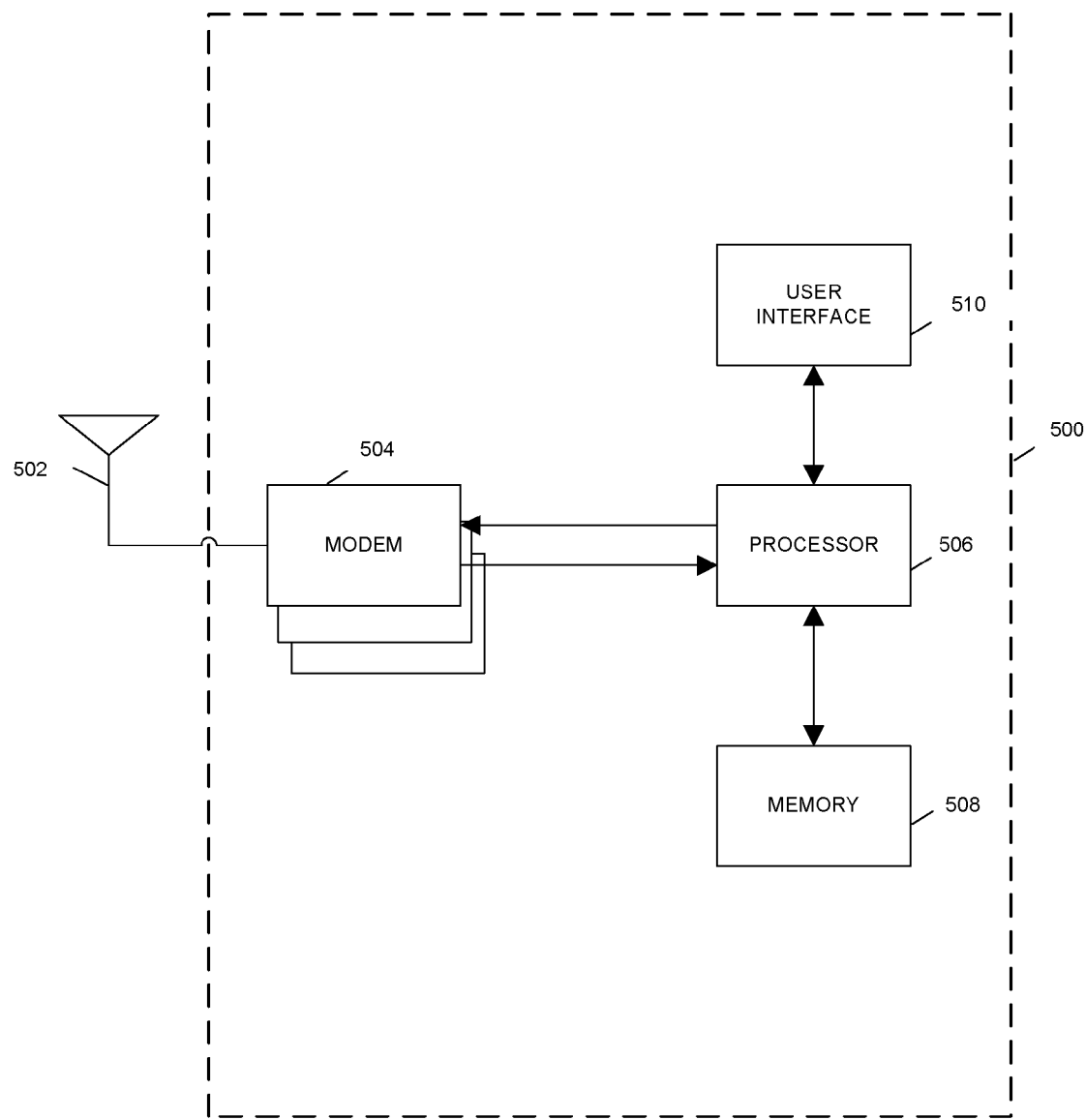
FIG. 5 is a block diagram illustrating certain components of a wireless access terminal in accordance with one embodiment.

FIG. 5 is a block diagram illustrating certain components of a wireless access terminal 500 in accordance with one embodiment. It will be understood, that there are many components of a wireless access terminal that are not illustrated in FIG. 5, and that the components illustrated are not intended to be all encompassing. Rather, the components illustrated in FIG. 5 are illustrated for the purpose of describing relevant operations within a wireless access terminal 500.

Wireless access terminal 500 comprises an antenna 502 configured to transmit and receive wireless signals. It will be understood that antenna 502 can actually comprise a plurality of antennas depending on the implementation. Antenna 502 is coupled with modems 504, which are configured to receive wireless signals from antenna 502 and convert them into base band signals for processing by processor 506. Terminal 500 can, for example, comprise a different modem 504 for each air interface, to technology terminal 500 is configured to implement. Modems 504 are also configured to receive base band signals from processor 506, and convert them into signals that can be transmitted via antenna 502. Thus, modems 504 can comprise the demodulators, filters, amplifiers, and analog to digital converters, needed to convert the wireless signals received by antenna 502 into a base band signal that can be processed by processor 506. Modems 504 can also comprise the digital to analog converters, filters, modulators, and amplifiers, needed to take a base band signal from processor 506 and convert it into a signal that can be transmitted via antenna 502.

It will be understood, that some of the components just described in relation to modem 504, can be included in processor 506, and that the description above is not intended to limit wireless access terminal 500 to any particular configuration or architecture. Moreover, it will be understood that modems 504 can share resources, or that certain components of one modem can be reconfigured, or re-programmed so as to be used by another modem. For example, each modem 504 can use the same demodulators, which are tuned to the specific channel frequencies used by the various modems 504 as needed.

Processor 506 can be configured to process signals received from modems 504 and generate signals to be transmitted by modems 504. In addition, processor 506 can be configured to control the operation of wireless access terminal 504. For example, processor 506 can be configured to execute instructions stored in memory 508 that allow processor 506 to control the operation of wireless access terminal 500. Thus, processor 506 can be configured to implement the methods described in relation to FIGS. 1-3 by executing the appropriate instructions stored in memory 508.

It will be understood, that processor 506 can comprise one or more processing circuits, such as a digital signal processor, a microcontroller or microprocessor, a math co-processor, etc. Moreover, processor 506 can comprise one or more integrated circuits depending on the embodiment. Similarly, memory 508, which can also be configured to store variables associated with the operation of wireless access terminal 500, can comprise one or more memory devices such as permanent memory, as well as temporary memory. Memory 508 can comprise one or more integrated circuits, such as one or more EEPROMs, one or more SRAMs, one or more flash memory devices, as well as one or more removable storage mediums.

Wireless access terminal 500 also includes user interface 510, which comprises the mechanisms by which information is communicated to or from a user of wireless access terminal 500. For example, user interface 510 can comprise a display, one or more LEDs or light indicators, a keypad, a shuttle dial, a buzzer, a speaker, a microphone, etc.

While certain embodiments have been described above, it will be understood that the embodiments described are by way of example only. Accordingly, the embodiments described should not be seen as limiting in anyway. For example, the embodiments described above are largely directed to 1×RTT/1×HRPD implementations; however, it will be understood that the embodiments described can extend to other air interface as well, e.g., WiMAX. Accordingly, the scope of the inventions described herein should only be limited in light of the claims that follow when taken in conjunction with the above description and accompanying drawings.

What is claimed is:

1. A method for determining slotted mode operation timing in a hybrid access terminal, comprising:
   determining a first access interval for a first acquired network by a controller installed on one or more computing devices;
   determining, with the controller, a second access interval for a second acquired network;
   determining, with the controller, whether the first and second access intervals overlap; and
   re-determining the second access interval in response to a determination that the first and second access intervals overlap.

2. The method of claim 1, further comprising:
   determining, with the controller, a third access interval for a third acquired network;
   determining, with the controller, if the third access interval overlaps with the first and second access intervals; and
   re-determining the third access interval when it is determined that the third access interval overlaps with the first and second access intervals.

3. The method of claim 1, wherein the first network is a 1×RTT network and the second network is a 1×HRPD network.

4. The method of claim 3, wherein said determining the first access interval comprises receiving a slot cycle index from the first network and determining the first access interval using the slot cycle index, and said determining the second access interval comprises determining a random number and determining the second access interval using the random number.

5. The method of claim 4, wherein the random number is a SessionSeed, and wherein said determining the second access interval using the random number comprises determining the number of Control Channel Cycles (C) since the beginning of CDMA System Time using the following:

$$(C+R) \bmod \text{NIDPSleep} = 0,$$

where R is the result of applying a hash function using the following parameters:
   Key=SessionSeed;
   Decorrelate=6×SessionSeed[11:0−]; and
   N=NIDPSleep.

6. The method of claim 1, wherein determining whether the first and second access intervals overlap further comprises:
   determining a first access period for the first network;
   determining a second access period for the second network;
   determining whether the first access interval is greater than the second access interval; and
   in response to a determination that the first access interval is greater than the second access interval, determining whether the first access interval is greater than the second access interval plus the second access period.

7. The method of claim 6, further comprising re-determining the second access interval in response to a determination that the first access interval is not greater than the second access interval plus the second access period.

8. The method of claim 6, further comprising determining whether the first access interval is equal to the second access interval in response to a determination that the first access interval is not greater than the second access interval.

9. The method of claim 6, further comprising re-determining the second access interval in response to a determination that the first access interval is equal to the second access interval.

10. The method of claim of claim 8, further comprising determining whether the first access interval is less than the second access in response to a determination that the first access interval is not equal to the second access interval.

11. The method of claim 10, further comprising re-determining the second access interval in response to a determination that the first access interval is not less than the second access interval.

12. A wireless access terminal configured to monitor signals from at least two different access networks configured to use different communication technologies, the wireless access terminal comprising:
    a first modem configured to monitor signals from a first access network;
    a second modem configured to monitor signals from a second access network;
    a controller configured to:
        determine a first access interval for the first network acquired by the first modem;
        determine a second access interval for the second network acquired by the second modem;
        determine whether the first and second access intervals overlap; and
        re-determine the second access interval in response to a determination that the first and second access intervals overlap.

13. The wireless access terminal of claim 12, further comprising a third modem, and wherein the controller is further configured to:
    determine a third access interval for a third network acquired by the third modem;
    determine whether the third access interval overlaps with the first and second access intervals; and
    re-determine the third access interval in response a determination that the third access interval overlaps with the first and second access intervals.

14. The wireless access terminal of claim 12, wherein the first modem is a 1×RTT modem and the second modem is a 1×HRPD modem.

15. The wireless access terminal of claim 14, wherein the controller is further configured to receive a slot cycle index from the first network, to determine the first access interval using the slot cycle index, to determine a random number, and determine the second access interval using the random number.

16. The wireless access terminal of claim 15, wherein the controller is further configured to:
    determine a first access period for the first network;
    determine a second access period for the second network;
    determine whether the first access interval is greater than the second access interval; and
    in response to a determination that the first access interval is greater than the second access interval, then determine whether the first access interval is greater than the second access interval plus the second access period.

17. The wireless access terminal of claim 16, wherein the controller is further configured to re-determine the second access interval in response to a determination that the first access interval is not greater than the second access interval plus the second access period, and wherein re-determining the second access period comprises determining a new random number and using the new random number to re-determine the second access interval.

18. The wireless access terminal of claim 16, wherein the controller is further configured to determine whether the first access interval is equal to the second access interval in response to a determination that the first access interval is not greater than the second access interval.

19. The wireless access terminal of claim 18, wherein the is further configured to re-determine the second access interval in response to a determination that the first access interval is equal to the second access interval.

20. The wireless access terminal of claim of claim 18, wherein the controller is further configured to determine whether the first access interval is less than the second access interval in response to a determination that the first access interval is not equal to the second access interval, and re-determine the second access interval in response to a determination that the first access interval is not less than the second access interval.

* * * * *